Sept. 4, 1945.  S. B. HASELTINE ET AL  2,384,091
FRICTION SHOCK ABSORBER
Filed Dec. 22, 1943  2 Sheets-Sheet 1
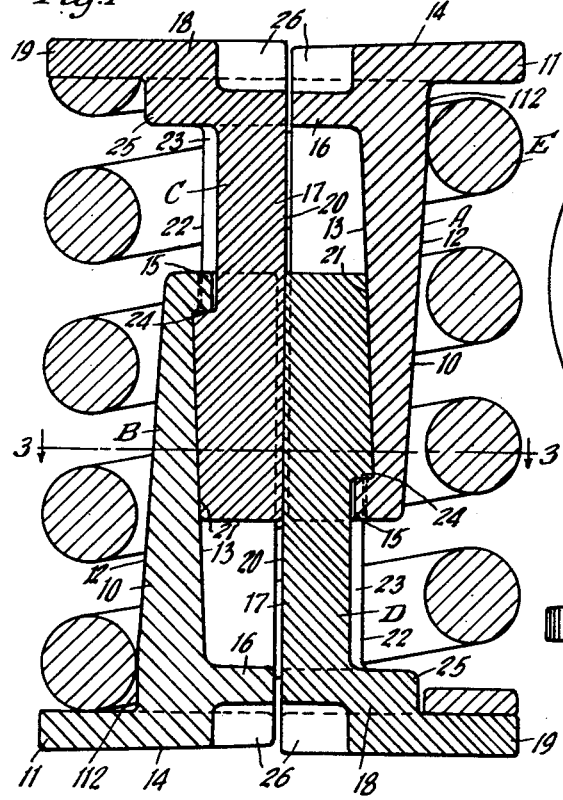
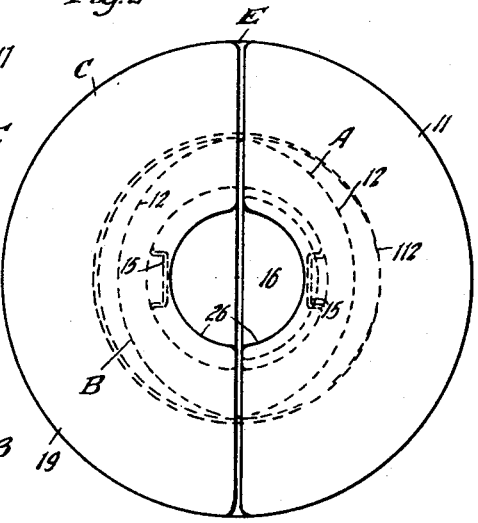
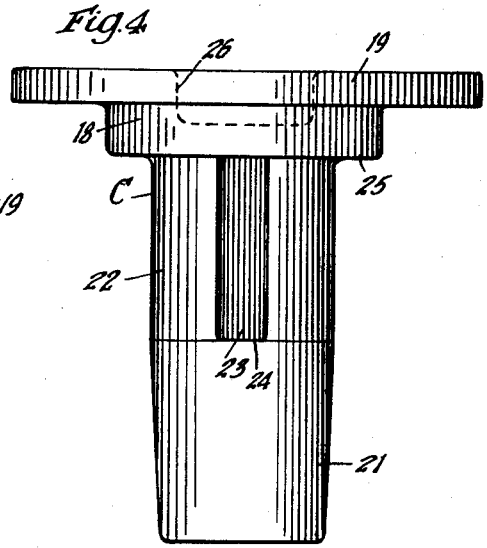
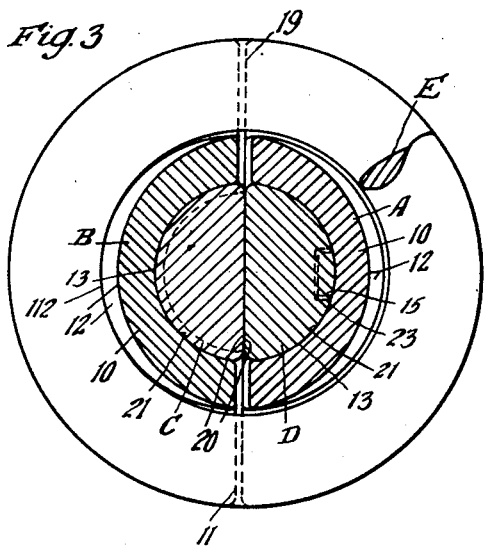
Inventors
Stacy B. Haseltine
George E. Dath
By Henry Fuchs Atty.

Sept. 4, 1945. S. B. HASELTINE ET AL 2,384,091
FRICTION SHOCK ABSORBER
Filed Dec. 22, 1943 2 Sheets-Sheet 2
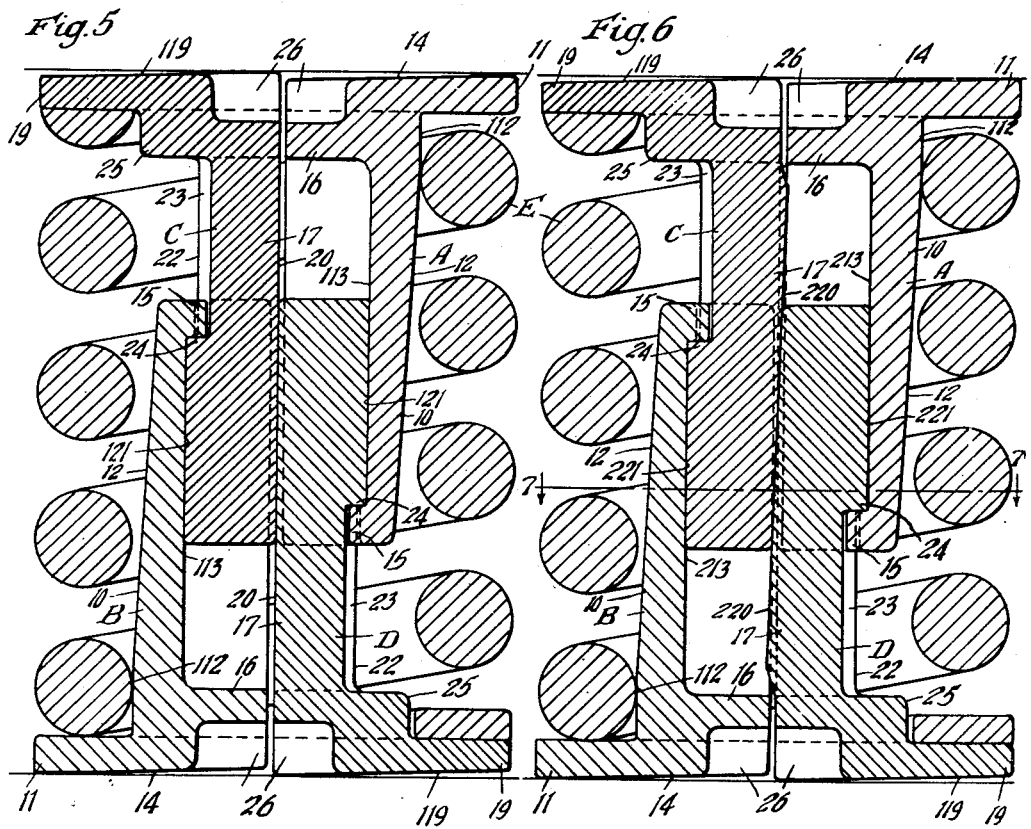
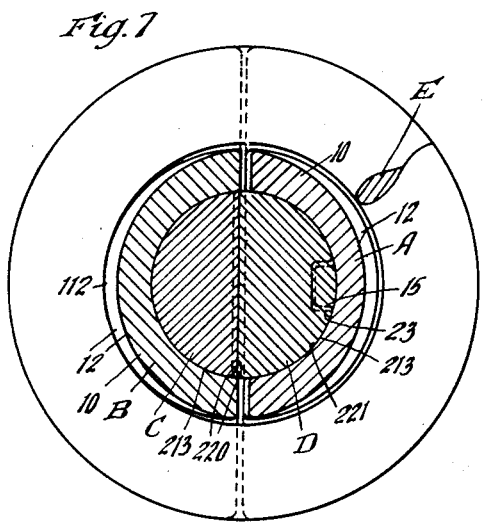
Inventors
Stacy B. Haseltine
George E. Dath
By Henry Fuchs
Atty.

Patented Sept. 4, 1945

2,384,091

UNITED STATES PATENT OFFICE 2,384,091

FRICTION SHOCK ABSORBER

Stacy B. Haseltine, La Grange, and George E. Dath, Chicago, Ill., assignors to W. H. Miner, Inc., Chicago, Ill., a corporation of Delaware Application December 22, 1943, Serial No. 515,212

16 Claims. (Cl. 267—9)

This invention relates to improvements in friction shock absorbers, especially adapted for use in connection with truck springs of railway cars for snubbing the action of the truck springs.

One object of the invention is to provide a friction shock absorber comprising a plurality of relatively movable friction members having interengaging friction surfaces extending lengthwise thereof, together with spring means opposing relative movement of said members, wherein the spring resistance also acts to force certain of said members laterally against the remaining members to provide tight frictional engagement.

Another object of the invention is to provide a shock absorber, as specified in the preceding paragraph wherein certain of the interengaging friction members are tapered lengthwise to force the friction members laterally toward each other to produce the proper frictional contact between the friction surfaces thereof.

A more specific object of the invention is to provide a friction shock absorber comprising two sets of lengthwise relatively movable friction members, and spring means yieldingly opposing relative lengthwise movement of said sets of members, wherein the members of one set are intercalated with the members of the other set, and one member of each set is laterally tiltable, and the spring means exerts pressure on said tiltable member to tilt the same against the adjacent members to press said members of said sets together into tight frictional contact.

A further object of the invention is to provide a mechanism as set forth in the preceding paragraph wherein certain of said intercalated members are tapered to wedge said intercalated members in tight frictional contact.

In the drawings forming a part of this specification, Figure 1 is a transverse, vertical sectional view of our improved shock absorber, said section being in a plane coincident with the central vertical axis of the mechanism. Figure 2 is a top plan view of Figure 1. Figure 3 is a transverse, horizontal sectional view, corresponding substantially to the line 3—3 of Figure 1. Figure 4 is an elevational view of one of the friction shoes of our improved shock absorber, the shoe illustrated being the upper shoe at the left hand side of Figure 1, looking from left to right in said figure. Figure 5 is a view, similar to Figure 1, illustrating another embodiment of the invention. Figure 6 is a view, similar to Figure 1, illustrating still another embodiment of the invention. Figure 7 is a transverse, horizontal sectional view, corresponding substantially to the line 7—7 of Figure 6.

Referring first to the embodiment of the invention shown in Figures 1 to 4 inclusive, our improved shock absorber comprises broadly upper and lower friction posts A and B; upper and lower friction shoes C and D, having frictional engagement with each other and with the posts; and a spring resistance E surrounding the posts and shoes and yieldingly opposing relative movement of the same.

The friction posts A and B are of like design, but reversely arranged, the post A being inverted with respect to the position of the post B. The posts A and B are arranged at opposite sides of the mechanism, respectively at the top and bottom thereof, as clearly shown in Figure 1.

Each post comprises a relatively heavy, transversely curved plate member 10 and a laterally projecting, curved base flange 11 at one end of the plate member, the base flange 11 of the post A being at the upper end thereof and projecting laterally outwardly, and the base flange 11 of the post B being at the lower end thereof and projecting laterally outwardly in a direction opposite to the flange of the post A.

The friction plate member 10 of each post is tapered toward its outer end and presents on its outer side a longitudinally extending, transversely curved surface 12. The surface 12 is of true cylindrical contour and is inclined with respect to the vertical central axis of the mechanism, except at the base of the post where it extends vertically being parallel to said axis, said vertical face portion being indicated by 112. On the inner side, the plate member 10 of each post presents a transversely curved, truly cylindrical friction surface 13, which is inclined with respect to said vertical central axis, the inclination being reverse to that of the outer surface 12, as shown in Figure 1. The friction surface 13 of the plate member 10 of the post A, considered as extending downwardly, is inclined away from the central vertical axis of the mechanism, and the friction surface 13 of the plate member 10 of the post B, considered as extending upwardly, is also inclined away from said axis. The two friction surfaces 13—13 of the posts A and B preferably have the same inclination. The outer surface 12 of the plate member 10 of the post A, considered as extending downwardly, is inclined toward the central vertical axis of the mechanism, and the surface 12 of the member 10 of the post B, considered as extending upwardly, is also inclined inwardly toward said axis.

The base flange 11 of the post A has the upper surface 14 thereof disposed at a slight angle to a plane at right angles to the central vertical axis of the mechanism. The lower surface of the base flange 11 of the post B, which is also indicated by 14, is similarly disposed. In other words, the surface 14 of the flange 11 of the post A is inclined to the horizontal in outward direction and the surface 14 of the flange 11 of the post B is inclined in inward direction. The posts A and B are thus tiltable on their respective bases, the base flanges 11 of said posts being adapted to fulcrum on their outer ends. The plate 10 of each post has an inturned stop lug 15 at its outer end, the lugs 15—15 of the posts A and B being respectively at the lower and upper ends thereof. At the base portion of each post, a horizontally disposed interior web 16 is provided on the inner side of the plate 10. This web forms a stop for limiting compression of the mechanism, as hereinafter pointed out.

The shoes C and D are of similar design. Each shoe comprises a relatively heavy platelike member 17 and a base portion 18 provided with a laterally outwardly extending flange 19. On the inner side, the plate member of each shoe is provided with a longitudinally extending flat friction surface 20. The friction surface 20 extends vertically and engages the friction surface 20 of the other shoe. The plate member of the shoe has a longitudinally extending, transversely curved, exterior friction surface 21 at the end thereof remote from the base portion 18, which is of true cylindrical contour and is inclined to the vertical. The outer surface portion 22 of the plate member 17 of the shoe, between the base portion 18 and the friction surface 21 is transversely curved and extends vertically, merging with the inner end of the surface 21. The transversely curved surface portion 22 is vertically grooved at the mid portion thereof, as indicated by 23, thereby providing a horizontal stop shoulder 24 at the inner end of the friction surface 21. The base portion 18 is thickened inwardly of the flange 19, thereby providing a ledge 25 acting as an abutment or stop to limit compression of the mechanism, as hereinafter pointed out. The base flange 19 is disposed at right angles to the vertical friction surface 20 of the shoe so that it will bear flatly on a horizontal surface.

The friction posts or plate members A and B are disposed at opposite sides of the mechanism, the post A being at the right hand side and the post B at the left hand side, as shown in Figure 1, with the flange 11 at the base of the post A at the upper end of the mechanism and projecting laterally outwardly, and the friction surface 13 of the plate member 10 of said post facing inwardly, and with the flange 11 at the base of the post B at the lower end of the mechanism and projecting laterally outwardly, and the friction surface 13 of the plate member 10 of said post B facing inwardly and opposed to the friction surface of the post A. The friction shoes C and D are disposed at opposite sides of the center of the mechanism, the shoe C being at the left hand side and the shoe D at the right hand side, as shown in Figure 1, with the flanged end of the former at the upper end of the mechanism and that of the shoe D at the lower end. The friction plate member 17 of the shoe C depends from the flange 19 thereof and has the friction surface 20, which is on the inner side thereof, slidingly engaged with the friction surface 20 of the upstanding plate member 17 of the shoe D. The outer friction surfaces 21—21 of the shoes C and D are respectively engaged with the interior friction surfaces 13—13 of the posts B and A, and are correspondingly inclined thereto, to assure true surface contact. The lugs 15—15 at the outer ends of the inner friction surfaces 13—13 of the posts A and B are engaged respectively with the shoulders 24—24 of the shoes D and C and limit lengthwise separation of the posts and shoes and serve to hold the mechanism assembled.

The spring E, which is in the form of a single coil, surrounds the shoes and posts and bears at its upper end on the flanges 11 and 19 of the post A and shoe C and at its lower end on the flanges 11 and 19 of the post B and shoe D. The spring E is under initial compression in the normal expanded condition of the shock absorber and presses the posts against the shoes, due to the pressure exerted on the base flanges 11 of the posts, which are fulcrumed at their outer sides. The spring E closely embraces the base portions of the posts A and B, the inner side of the top coil having bearing engagement at the right hand side of the mechanism with the vertical face 112 of the base portion of the post A, and the inner side of the bottom coil having bearing engagement at the left hand side of the mechanism with the face 112 of the base portion of the post B. Slight clearance is preferably provided between the inner side of the coil spring and the outer walls of the raised ledge portions 25—25 at the base portions of the shoes C and D.

To accommodate the spring centering projection usually employed on the top and bottom spring follower plates of a cluster of truck springs, the base portions of the shoes C and D and posts A and B are recessed to provide seats 26—26.

Referring next to the embodiment of the invention illustrated in Figure 5, the construction is the same as that shown in Figures 1, 2, 3, and 4, with the exception that the cooperating friction surfaces of the posts and shoes are perpendicular, that is, are not inclined and the shoes are tiltable, having the outer surfaces of their base flanges inclined to the horizontal to provide for tilting action. In Figure 5, the parts of the shock absorber which are similar to those described in connection with Figures 1 to 4 inclusive are indicated by the same reference characters used in Figures 1 to 4 inclusive.

As shown in Figure 5, the transversely curved plate members 10—10 of the posts A and B have transversely curved, cylindrical friction surfaces 113—113 on their inner sides, which are parallel to the central vertical axis of the mechanism, and the plate members 17—17 of the shoes C and D have transversely curved, cylindrical friction surfaces 121—121 on their outer sides, which are also parallel to the vertical axis of the mechanism. The friction surfaces 121 of the shoes have lengthwise sliding engagement with the friction surfaces of the posts. The flange 19 of the top shoe C has its top surface 119 inclined to the horizontal in a direction outwardly away from the central vertical axis of the mechanism. The flange of the bottom shoe D also has the bottom surface thereof inclined to the horizontal in a direction outwardly away from said axis. The shoes C and D are thus arranged for tilting movement outwardly away from the center of the mechanism, respectively towards the friction posts B and A.

Referring next to the embodiment of the invention illustrated in Figures 6 and 7, the construction is the same as that shown in Figures 1, 2, 3, and 4, with the exception that the cooperating friction surfaces of the posts and shoes are perpendicular, that is, are not inclined, and the interengaging friction surfaces of the shoes are at a slight angle to the vertical, that is, are slightly inclined and the shoes are tiltable as in the form of the invention shown in Figure 5.

In Figures 6 and 7, the parts of the shock absorber, which are similar to those described in connection with Figures 1 to 4 inclusive, are indicated by the same reference characters used in Figures 1 to 4 inclusive.

As shown in Figures 6 and 7, the transversely curved plate members 10—10 of the posts A and B have transversely curved, cylindrical friction surfaces 213 on their inner sides, which are parallel to the central vertical axis of the mechanism, and the plate members 17—17 of the shoes C and D have transversely curved, cylindrical friction surfaces 221—221 on their outer sides, which are also parallel to said vertical axis, and longitudinally extending, flat friction surfaces 220—220 on their inner sides which extend at a slight angle to said axis, that is, are inclined to the vertical.

The direction of inclination of the friction surfaces 220—220 of the shoes is such that each shoe is, in effect, tapered from the inner to the outer end, whereby when said shoes are slid lengthwise with respect to each other they are wedged apart laterally.

In assembling our improved shock absorber, the same procedure is followed in all of the embodiments of the invention illustrated. The coil spring E is first engaged over the plate members of the post B and the shoe D. The post A and shoe C are then assembled with the other parts by entering the plate members 10 and 17 thereof within the spring coil spring E, through the upper end of the latter, and engaging the plate member 17 of the shoe C between the plate member 10 of the post B and plate member 17 of the shoe D and the plate member 10 of the post A between the plate member 17 of the shoe D and the inner side of the spring E. While the parts are being thus intercalated, the posts A and B are held in tilted position so that the lugs 15—15 thereof will clear the outer friction surfaces of the shoes. The mechanism is compressed until the lugs 15—15 pass and snap underneath the shoulders 24—24 of the shoes.

Our improved shock absorber illustrated in Figures 1 to 4 inclusive, Figure 5, and Figures 6 and 7 preferably replaces one of the spring units of a truck spring cluster, however, several of our improved shock absorbers may be employed in a single spring cluster, replacing two or more units of the same, said shock absorber being interposed between the top and bottom spring follower plates of the spring cluster.

The operation of the improved shock absorber illustrated in Figures 1 to 4 inclusive is as follows: Upon the spring cluster of the truck of a railway car being compressed between the spring follower plates of said cluster, our improved shock absorber, which is disposed between said follower plates, is compressed therewith, forcing the posts A and B and the friction shoes C and D toward each other, lengthwise of the mechanism against the resistance of the spring E, thereby effecting relative sliding movement between the shoes C and D on their friction surfaces 20—20 and relative sliding movement of the shoes and the posts on their cooperating friction surfaces 13 and 21. Due to the pivoted arrangement of the posts A and B, the pressure of the spring E maintains tight contact between the friction surfaces of the posts and shoes, and between the friction surface of the two shoes, the latter being squeezed together between the posts. As compression of the mechanism progresses, the posts A and B are spread apart through the wedging action provided by the cooperating inclined friction surfaces of the shoes and posts, the posts being tilted outwardly against the resistance of the spring E. High frictional resistance is thus produced to effectively snub the action of the truck springs.

As the spring follower plates of the truck springs are separated, due to recoil of the springs, the friction posts A and B and the shoes C and D are moved apart lengthwise by the expansive action of the spring E, thereby restoring the parts to the normal release position shown in Figure 1, lengthwise separation of the posts and shoes being limited by engagement of the lugs 15—15 of the posts A and B with the shoulders 24—24 of the shoes D and C.

The operation of the shock absorber illustrated in Figure 5 is the same as the operation of the mechanism shown in Figures 1 to 4 inclusive, with the exception that there is no wedging action between the shoes and posts, the required pressure to maintain the desired frictional resistance between the various friction surfaces being provided by tilting action of the shoes against the posts, the shoes in addition to the posts being fulcrumed on their bases for rocking movement toward the posts.

The operation of the shock absorber illustrated in Figures 6 and 7 is the same as that described in connection with Figures 1 to 4 inclusive, with the exception that the shoes are tiltable toward the posts A and B and have wedging engagement with each other to produce the desired pressure on the friction surface of the parts of the mechanism instead of the wedging action being provided between the posts and shoes as in Figures 1 to 4 inclusive.

We have herein shown and described what we now consider the preferred manner of carrying out our invention, but the same is merely illustrative and we contemplate all changes and modifications that come within the scope of the claims appended hereto.

We claim:

1. In a friction shock absorber, the combination with a pair of upper and lower friction members disposed at diametrically opposite sides of the mechanism and having cooperating, lengthwise extending, interengaging friction surfaces on their inner sides, said members being slidable lengthwise with respect to each other; of an additional pair of upper and lower friction members disposed respectively on opposite sides of said first named friction members and having sliding frictional engagement with the outer sides of said first named upper and lower members, respectively, each of said upper and lower members having a laterally extending flange projecting from the outer side thereof; and a spring surrounding said upper and lower members, said spring being interposed between and engaging said flanges of said upper and lower members to oppose relative approach of said upper and lower members lengthwise of the mechanism, said spring opposing lateral separation of said members.

2. In a friction shock absorber, the combination with an upper friction shoe having a longitudinally extending friction surface on the inner side thereof; of a lower friction shoe having a longitudinally extending friction surface on the inner side thereof, said shoes having lengthwise sliding engagement with each other on said inner surfaces; upper and lower friction posts embracing said shoes at opposite sides, said upper post having lengthwise sliding engagement with the outer side of said lower shoe, and said lower post having lengthwise sliding engagement with the outer side of said upper shoe, said upper and lower shoes and posts having base flanges rigid therewith, the base flanges of said posts being fulcrumed at their outer ends to provide rocking movement of said posts toward said shoes; and a spring surrounding said posts and shoes and bearing at its upper and lower ends on the base flanges of said posts and shoes.

3. In a friction shock absorber, the combination with an upper friction shoe having a longitudinally disposed, vertical friction surface on the inner side, said shoe having a laterally extending base flange at the upper end projecting from the outer side thereof; of a lower friction shoe having a longitudinally disposed, vertical friction surface on the inner side thereof, said last named shoe having a laterally extending base flange at the lower end projecting from the outer side thereof; upper and lower friction posts embracing said shoes at opposite sides, said upper friction post having lengthwise sliding engagement with the outer side of said lower shoe, and said lower post having lengthwise sliding engagement with the outer side of said upper shoe, said upper post having a laterally extending base flange at the upper end projecting from the outer side thereof, said lower post having a laterally extending base flange at the lower end projecting from the outer side thereof, said base flanges of the posts being fulcrumed on their outer ends to mount said posts for tilting movement; and a spring surrounding said posts and bearing at its upper and lower ends on said flanges of said posts and shoes.

4. In a friction shock absorber, the combination with an upper friction shoe having a flat, longitudinally disposed, vertical friction surface on the inner side, a transversely rounded, longitudinally disposed friction surface on the outer side thereof, and a laterally extending base flange projecting from the outer side at the upper end thereof; of a lower friction shoe having a flat, longitudinally disposed, vertical friction surface on the inner side, a transversely rounded, longitudinally disposed friction surface on the outer side thereof, and a laterally extending base flange projecting from the outer side thereof, said shoes being in sliding engagement with each other on said inner surfaces; upper and lower friction posts embracing said shoes at opposite sides, said posts having transversely curved, concave friction surfaces on their inner sides engaging the rounded friction surfaces of said lower and upper shoes, respectively, said upper post having a laterally extending base flange at the upper end projecting from one side thereof, said lower post having a laterally extending base flange at the lower end projecting from the outer side thereof, said base flanges of said posts being fulcrumed on their outer ends to provide tilting movement of said posts; and a coil spring surrounding said posts and bearing at the upper and lower ends on said flanges of said posts.

5. In a friction shock absorber, the combination with a pair of upper and lower friction members disposed at diametrically opposite sides of the mechanism and having cooperating, lengthwise extending, interengaging friction surfaces on their inner sides, said members being slidable lengthwise with respect to each other; of an additional pair of upper and lower friction members disposed respectively on opposite sides of said first named friction members and having sliding frictional engagement with the outer sides of said first named upper and lower members, respectively, on cooperating friction surfaces inclined to the vertical, each of said upper and lower members having a laterally extending flange projecting from the outer side thereof; and a spring surrounding said upper and lower members, said spring being interposed between and engaging said flanges of said upper and lower members to oppose relative approach of said upper and lower members lengthwise of the mechanism, said spring opposing lateral separation of said members.

6. In a friction shock absorber, the combination with an upper friction shoe having a longitudinally extending friction surface on the inner side thereof; of a lower friction shoe having a longitudinally extending friction surface on the inner side thereof, said shoes having lengthwise sliding engagement with each other on said inner surfaces; upper and lower friction posts embracing said shoes at opposite sides, said upper post having lengthwise sliding engagement with the outer side of said lower shoe, on cooperating friction surfaces inclined to the vertical, and said lower post having lengthwise sliding engagement with the outer side of said upper shoe, on cooperating friction surfaces inclined to the vertical, said upper and lower shoes and posts having base flanges rigid therewith, the base flanges of said posts being fulcrumed at their outer ends to provide rocking movement of said posts toward said shoes; and a spring surrounding said posts and shoes and bearing at its upper and lower ends on the base flanges of said posts and shoes.

7. In a friction shock absorber, the combination with an upper friction shoe having a longitudinally disposed, vertical friction surface on the inner side, said shoe having a laterally extending base flange at the upper end projecting from the outer side thereof; of a lower friction shoe having a longitudinally disposed, vertical friction surface on the inner side thereof, said last named shoe having a laterally extending base flange at the lower end projecting from the outer side thereof; upper and lower friction posts embracing said shoes at opposite sides, said upper friction posts having lengthwise sliding engagement with the outer side of said lower shoe, on cooperating friction surfaces inclined to the vertical, and said lower post having lengthwise sliding engagement with the outer side of said upper shoe, on cooperating friction surfaces inclined to the vertical, said upper post having a laterally extending base flange at the upper end projecting from the outer side thereof, said lower post having a laterally extending base flange at the lower end projecting from the outer side thereof, said base flanges of the posts being fulcrumed on their outer ends to mount said posts for tilting movement; and a spring surrounding said posts and bearing at its upper and lower ends on said flanges of said posts and shoes.

8. In a friction shock absorber, the combination with an upper friction shoe having a flat, longitudinally disposed, vertical friction surface on the inner side, a transversely rounded, longitudinally disposed friction surface on the outer side thereof inclined to the vertical, and a laterally extending base flange projecting from the outer side at the upper end thereof; of a lower friction shoe having a flat, longitudinally disposed, vertical friction surface on the inner side, a transversely rounded, longitudinally disposed friction surface on the outer side thereof inclined to the vertical, and a laterally extending base flange projecting from the outer side thereof, said shoes being in sliding engagement with each other on said inner surfaces; upper and lower friction posts embracing said shoes at opposite sides, said posts having transversely curved, concave friction surfaces on their inner sides engaging the rounded friction surfaces of said lower and upper shoes, respectively, said upper post having a laterally extending base flange at the upper end projecting from one side thereof, said lower post having a laterally extending base flange at the lower end projecting from the outer side thereof, said base flanges of said posts being fulcrumed on their outer ends to provide tilting movement of said posts; and a coil spring surrounding said posts and bearing at the upper and lower ends on said flanges of said posts.

9. In a friction shock absorber, the combination with a pair of upper and lower friction members disposed at diametrically opposite sides of the mechanism and having cooperating, lengthwise extending, interengaging friction surfaces on their inner sides, said friction surfaces being inclined to the vertical, said members being slidable lengthwise with respect to each other; of an additional pair of upper and lower friction members disposed respectively on opposite sides of said first named friction members and having sliding frictional engagement with the outer sides of said first named upper and lower members, respectively, each of said upper and lower members having a laterally extending flange projecting from the outer side thereof; and a spring surrounding said upper and lower members, said spring being interposed between and engaging said flanges of said upper and lower members to oppose relative approach of said upper and lower members lengthwise of the mechanism, said spring opposing lateral separation of said members.

10. In a friction shock absorber, the combination with an upper friction shoe having a longitudinally extending friction surface on the inner side thereof inclined to the vertical; of a lower friction shoe having a longitudinally extending friction surface on the inner side thereof inclined to the vertical, said shoes having lengthwise sliding engagement with each other on said inner surfaces; upper and lower friction posts embracing said shoes at opposite sides, said upper post having lengthwise sliding engagement with the outer side of said lower shoe, and said lower post having lengthwise sliding engagement with the outer side of said upper shoe, said upper and lower shoes and posts having base flanges rigid therewith, the base flanges of said posts being fulcrumed at their outer ends to provide rocking movement of said posts toward said shoes; and a spring surrounding said posts and shoes and bearing at its upper and lower ends on the base flanges of said posts and shoes.

11. In a friction shock absorber, the combination with an upper friction shoe having a flat, longitudinally disposed friction surface on the inner side inclined to the vertical, a transversely rounded, longitudinally disposed friction surface on the outer side thereof, and a laterally extending base flange projecting from the outer side at the upper end thereof; of a lower friction shoe having a flat, longitudinally disposed friction surface on the inner side inclined to the vertical, a transversely rounded, longitudinally disposed friction surface on the outer side thereof, and a laterally extending base flange projecting from the outer side thereof, said shoes being in sliding engagement with each other on said inner surfaces; upper and lower friction posts embracing said shoes at opposite sides, said posts having transversely curved, concave friction surfaces on their inner sides engaging the rounded friction surfaces of said lower and upper shoes, respectively, said upper post having a laterally extending base flange at the upper end projecting from one side thereof, said lower post having a laterally extending base flange at the lower end projecting from the outer side thereof, said base flanges of said posts being fulcrumed on their outer ends to provide tilting movement of said posts; and a coil spring surrounding said posts and bearing at the upper and lower ends on said flanges of said posts.

12. In a friction shock absorber, the combination with a pair of upper and lower friction members disposed at diametrically opposite sides of the mechanism and having cooperating, lengthwise extending, interengaging friction surfaces on their inner sides, said members being slidable lengthwise with respect to each other; of an additional pair of upper and lower friction members disposed respectively on opposite sides of said first named friction members and having sliding frictional engagement with the outer sides of said first named upper and lower members, respectively, each of said upper and lower members having a laterally extending flange projecting from the outer side thereof, said flanges being fulcrumed for rocking movement; and a spring surrounding said upper and lower members, said spring being interposed between and engaging said flanges of said upper and lower members to oppose relative approach of said upper and lower members lengthwise of the mechanism, said spring opposing lateral separation of said members.

13. In a friction shock absorber, the combination with an upper friction shoe having a longitudinally extending friction surface on the inner side thereof; of a lower friction shoe having a longitudinally extending friction surface on the inner side thereof, said shoes having lengthwise sliding engagement with each other on said inner surfaces; upper and lower friction posts embracing said shoes at opposite sides, said upper post having lengthwise sliding engagement with the outer side of said lower shoe, and said lower post having lengthwise sliding engagement with the outer side of said upper shoe, said upper and lower shoes and posts having base flanges rigid therewith, the base flanges of said posts being fulcrumed at their outer ends to provide rocking movement of said posts toward said shoes, the base flanges of said shoes being fulcrumed at their inner ends to provide for rocking movement of said shoes toward said posts; and a spring surrounding said posts and shoes and bearing at its upper and lower ends on the base flanges of said posts and shoes.

14. In a friction shock absorber, the combination with an upper friction shoe having a longitudinally disposed, vertical friction surface on the inner side, said shoe having a laterally extending base flange at the upper end projecting from the outer side thereof, said base flange being fulcrumed at its inner end; of a lower friction shoe having a longitudinally disposed, vertical friction surface on the inner side thereof, said last named shoe having a laterally extending base flange at the lower end projecting from the outer side thereof, said base flange being fulcrumed at its inner end; upper and lower friction posts embracing said shoes at opposite sides, said upper friction post having lengthwise sliding engagement with the outer side of said lower shoe, and said lower post having lengthwise sliding engagement with the outer side of said upper shoe, said upper post having a laterally extending base flange at the upper end projecting from the outer side thereof, said lower post having a laterally extending base flange at the lower end projecting from the outer side thereof, said base flanges of the posts being fulcrumed on their outer ends to mount said posts for tilting movement; and a spring surrounding said posts and bearing at its upper and lower ends on said flanges of said posts and shoes.

15. In a friction shock absorber, the combination with an upper friction shoe having a flat, longitudinally disposed, vertical friction surface on the inner side, a transversely rounded, longitudinally disposed friction surface on the outer side thereof, and a laterally extending base flange projecting from the outer side at the upper end thereof, said base flange being fulcrumed at its inner end; of a lower friction shoe having a flat, longitudinally disposed, vertical friction surface on the inner side, a transversely rounded, longitudinally disposed friction surface on the outer side thereof, and a laterally extending base flange projecting from the outer side thereof, said base flange being fulcrumed at its inner end, said shoes being in sliding engagement with each other on said inner surfaces; upper and lower friction posts embracing said shoes at opposite sides, said posts having transversely curved, concave friction surfaces on their inner sides engaging the rounded friction surfaces of said lower and upper shoes, respectively, said upper post having a laterally extending base flange at the upper end projecting from one side thereof, said lower post having a laterally extending base flange at the lower end projecting from the outer side thereof, said base flanges of said posts being fulcrumed on their outer ends to provide tilting movement of said posts; and a coil spring surrounding said posts and bearing at the upper and lower ends on said flanges of said posts.

16. In a friction shock absorber, the combination with upper friction members at opposite sides of the mechanism, extending lengthwise of the mechanism and having laterally extending base flanges at their upper ends projecting from the outer sides thereof; of lower friction members at opposite sides of the mechanism extending lengthwise of the mechanism and having laterally extending base flanges projecting from the outer sides thereof, said upper and lower friction members having lengthwise sliding engagement with each other, and said upper members being alternated with the lower members, said upper and lower members having interengaging shoulders to limit relative lengthwise separation thereof; and a spring surrounding said upper and lower members and having its upper and lower ends in engagement with the flanges of said upper and lower members, respectively.

STACY B. HASELTINE.
GEORGE E. DATH.